(12) United States Patent
Richards

(10) Patent No.: US 7,627,952 B2
(45) Date of Patent: Dec. 8, 2009

(54) VEGETATION TRIMMERS

(75) Inventor: Gareth Richards, Spennymoor (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/406,020

(22) Filed: Apr. 18, 2006

(65) Prior Publication Data
US 2006/0254063 A1 Nov. 16, 2006

(30) Foreign Application Priority Data
May 13, 2005 (GB) ................... 0509745.6

(51) Int. Cl.
*B26B 7/00* (2006.01)
(52) U.S. Cl. .............. 30/276; 30/390; 30/392; 30/501; 30/312; 30/DIG. 5
(58) Field of Classification Search .......... 30/276, 30/347, 388, 390, 392, 501, 272.1, 299, 312, 30/DIG. 5; 56/12.5, 12.7
See application file for complete search history.

(56) References Cited

U.S. PATENT DOCUMENTS

| 2,708,335 | A | * | 5/1955 | Newton ................... 56/12.7 |
| 3,977,078 | A | | 8/1976 | Pittinger, Jr. |
| 4,062,115 | A | | 12/1977 | Lee |
| 4,202,094 | A | | 5/1980 | Kalmar |
| 4,223,441 | A | | 9/1980 | Everts |
| 4,286,675 | A | * | 9/1981 | Tuggle ................... 173/213 |
| 4,505,040 | A | * | 3/1985 | Everts ................... 30/296.1 |
| 4,845,929 | A | * | 7/1989 | Kawasaki et al. ........... 56/17.5 |
| 5,313,770 | A | * | 5/1994 | Smothers ................ 56/12.7 |
| 5,577,374 | A | * | 11/1996 | Huston .................... 56/12.1 |
| 5,662,428 | A | * | 9/1997 | Wilson .................. 403/374.5 |
| 5,810,093 | A | | 9/1998 | Howard |
| 5,826,667 | A | * | 10/1998 | Notaras et al. ............. 172/15 |
| 5,862,595 | A | * | 1/1999 | Keane .................... 30/124 |
| 5,884,460 | A | * | 3/1999 | Serravalle et al. ............ 56/1 |
| 5,970,692 | A | * | 10/1999 | Foster .................... 56/12.1 |
| 6,116,350 | A | * | 9/2000 | Notaras et al. ............. 172/15 |
| 6,256,970 | B1 | * | 7/2001 | Fleener ................... 56/12.7 |
| 6,581,246 | B1 | * | 6/2003 | Polette ..................... 16/429 |
| 6,862,871 | B2 | * | 3/2005 | Morabit et al. ............ 56/12.7 |
| 7,275,325 | B2 | * | 10/2007 | Warashina et al. ......... 30/276 |

* cited by examiner

*Primary Examiner*—Timothy V Eley
(74) *Attorney, Agent, or Firm*—John Yun; Bruce S. Shapiro; Wesley Muller

(57) ABSTRACT

The present invention provides a vegetation trimmer comprising a cutting head (20) located at one end thereof, a rear handle (60) located at the other end thereof, a motor (10), and a flexible drive shaft (30) for transferring the output of the motor to the cutting head, wherein the motor is located in a substantially central position on the vegetation trimmer. Preferably, the motor is located beneath the flexible drive shaft when the vegetation trimmer is oriented with the rear handle thereof uppermost. The vegetation trimmer of the invention has improved balance and inertia, making it easier for a user to operate, and in certain embodiments thereof can be made more compact than a conventional vegetation trimmer having a flexible drive shaft for greater ease of shipping and storage. Moreover, the trimmer of the invention may be operated with equal comfort by both left- and right-handed users in both trimming and edging modes, may be adjusted for comfortable operation by users of different heights, and also has reduced noise.

5 Claims, 6 Drawing Sheets

VEGETATION TRIMMERS

FIELD OF THE INVENTION

The present invention concerns vegetation trimmers, which are well-known power tools suitable for use in cutting vegetation, such as grass. Typically, such vegetation trimmers comprise a cutting head having one or more lengths of cutting line or one or more stiff cutting blades, or both. The vegetation trimmer further comprises a motor, such that during operation of the trimmer by a user, the cutting line and/or blades are caused to rotate at high speed by the action of the motor. Thus when the rapidly rotating cutting line and/or blades are brought into contact with standing vegetation, they serve to sever the vegetation as required. The motor of the vegetation trimmer may be electrically or petrol driven, and if electrically driven, may be powered by mains electricity or by a battery pack. An example of such a vegetation trimmer is described in European patent number EP 0 841 000 B in the name of the present applicant.

BACKGROUND OF THE INVENTION

The overall layout of conventional vegetation trimmers can best be understood by reference to the accompanying FIGS. 1 and 2, in which the parts of the trimmers shown therein are labelled as follows:

| | |
|---|---|
| 10 | Motor |
| 20 | Cutting head |
| 30 | Drive shaft |
| 50 | Front handle |
| 60 | Rear handle |
| 70 | Fulcrum |

The two heaviest components of a vegetation trimmer are generally the cutting head and the motor. In operation, the trimmer is typically swung from side to side by a user by a twisting motion of the body and arms of the user about the fulcrum 70, in the manner indicated by the arrowed arcs A and B shown in FIGS. 1 and 2.

Most conventional vegetation trimmers have the layout shown in FIG. 1. In this configuration, both the motor and the cutting head are located at the bottom end of the trimmer and a rigid drive shaft is used to connect the output of the motor to the cutting head. There may also be a gear train located between the motor and the cutting head to change the rate of rotation. In this case, the two heaviest components of the trimmer are both located at the bottom end of the trimmer.

However, some conventional vegetation trimmers have the different layout shown in FIG. 2. In this configuration, only the cutting head is located at the bottom end of the trimmer and the motor is instead located at the top end. Because the two heaviest components of the trimmer are now located at its opposite ends, the trimmer of FIG. 2 is better balanced than the trimmer of FIG. 1. However, because in the configuration of FIG. 2, the output from the motor is no longer parallel with the axis of rotation of the cutting head, a flexible drive shaft must be used instead of a rigid drive shaft to transfer the output of the motor to the cutting head. Once again, there may also be a gear train located between the motor and the cutting head to change the rotation speed. This flexible drive shaft is typically constructed from layers of wound wire as shown in FIG. 3 and as a result, is somewhat like a stiff spring.

However, both of the conventional layouts of vegetation trimmer shown in FIGS. 1 and 2 have certain disadvantages relating to their balance and inertia which are explained in greater detail below.

BRIEF SUMMARY OF THE INVENTION

Accordingly, in order to address these problems with balance and inertia of the conventional vegetation trimmers described above, the present invention provides a vegetation trimmer comprising a cutting head located at one end thereof, a rear handle located at the other end thereof, a motor, and a flexible drive shaft for transferring the output of the motor to the cutting head, wherein the motor is located in a substantially central position on the vegetation trimmer. Preferably, the motor is located beneath the flexible drive shaft when the vegetation trimmer is oriented with the rear handle thereof uppermost.

The vegetation trimmer of the invention can therefore have the layout shown in FIG. 4, which is different from the layouts of the conventional trimmers shown in FIGS. 1 and 2. Like the conventional trimmer of FIG. 2, it uses a flexible drive shaft to transfer the output of the motor to the cutting head located at the bottom end of the trimmer. However, in the case of the vegetation trimmer of the invention, the motor is not located at the top end of the trimmer, but rather in a mid-mounted position between the cutting head and the rear handle 60. If it is additionally located beneath the flexible drive shaft as shown in FIG. 4, the output from the motor must therefore be transferred to the flexible drive shaft by a gear mechanism, 40, also shown in FIG. 4.

The advantages of the layout of the vegetation trimmer of the invention over the layout of the conventional vegetation trimmers of FIGS. 1 and 2 can best be understood by reference to the following quantities:

| | |
|---|---|
| c | mass of cutting head |
| m | mass of motor |
| $l_1$ | distance of cutting head from fulcrum 70 |
| $l_2$ | distance of motor from fulcrum 70 |

Balance

How well balanced each of the trimmers shown in FIGS. 1, 2 and 4 is can be calculated by working out their static moments. The static moment indicates the tendency of each trimmer to turn under its own weight if held at its fulcrum, and is given by multiplying the masses of the components of the trimmer by their distances from the fulcrum. The trimmer of FIG. 1 therefore has a static moment given by the combined mass of the motor and cutting head (m+c) times their distance, $l_1$, from the fulcrum. This is clearly quite a large force and must be countered by a user exerting an equal and opposite force on the rear handle 60, which is quite uncomfortable and is the main reason why trimmers with the layout of FIG. 2 were developed.

The trimmer of FIG. 2 has a total static moment given by the moment exerted by the motor subtracted from the moment exerted by the cutting head (since they are on opposite sides of the fulcrum), or $l_1 - m\, l_2$. During design of a trimmer having the layout of FIG. 2, this allows the moment of the cutting head to be exactly balanced by the moment of the motor by careful selection and adjustment of the weights of the cutting head and the motor and of the distance of each from the fulcrum. For example, if the motor weighs twice as much as the cutting head, it should be located half the distance from the fulcrum as the cutting head is for the trimmer to be perfectly balanced. In this case, the weight of the other components of the trimmer must also be taken into account to ensure perfect balance.

In the vegetation trimmer of the invention, as shown in FIG. 4, since the motor is not necessary located along the main axis of the trimmer, but may in fact be located beneath the fulcrum, the total static moment of the trimmer is instead given by:

$$(cl_1 \cos\theta_1) - (ml_2 \cos\theta_2),$$

where $\theta_1$ is the angle by which a line drawn through the fulcrum and the cutting head's centre of gravity and $\theta_2$ is the angle by which a line drawn through the fulcrum and the motor's centre of gravity each deviate from the horizontal (see FIG. 5, where the horizontal is labelled as Z-Z'). It is still therefore possible with the above formula to balance out the trimmer during its design, particularly when the moment exerted by rear handle 60 is also taken into account. For example, in one possible embodiment of the invention, the motor may be located directly (vertically) below the fulcrum, in which case, its moment will be zero. The moment exerted by the lower end of the trimmer (including the cutting head) can then be balanced exactly by the moment exerted by the upper end of the trimmer (including the rear handle 60). The vegetation trimmer of the invention therefore has the same advantage of balance over trimmers with the layout of FIG. 1 as do trimmers with the layout of FIG. 2.

Inertia

The effort required to swing each of the trimmers shown in FIGS. 1, 2 and 4 from side to side can also be worked out by calculating their (dynamic) moments of inertia. The moment of inertia indicates the resistance of each trimmer to a turning force and in this case, is given by multiplying the masses of the components of the trimmer by their distances from the fulcrum squared. Since these distances are always squared, they are always additive and cannot cancel each other out. As well as being the least balanced, the trimmer of FIG. 1 therefore also has the greatest moment of inertia, since both the motor and the cutting head are located far from the fulcrum. The trimmer of FIG. 2 has a smaller moment of inertia than the trimmer of FIG. 1 because its motor is located closer to the fulcrum. However, the vegetation trimmer of the invention has the smallest moment of inertia of all three layouts because its motor (which is the heaviest component of the trimmer) is located closest to the fulcrum. It therefore requires the least effort of all of the trimmers to be swung from side to side.

Both the static moments and the dynamic moments of inertia of the trimmers of FIGS. 1, 2 and 4 are summarized in Table 1 below, where although it is clear that the moment of inertia of the trimmer of FIG. 4 is given by the same formula as the trimmer of FIG. 2, it must be remembered that the numerical value of $l_2$ in the trimmer of FIG. 4 is less than the numerical value of $l_2$ in the trimmer of FIG. 2 and also that this difference in the value of $l_2$ is magnified by being squared. The vegetation trimmer of the invention therefore has the best combination of balance and ease of operation of the three different trimmer layouts of FIGS. 1, 2 and 4.

TABLE 1

| Layout | Static moment (= mass × distance) | Moment of inertia (= mass × distance$^2$) |
|---|---|---|
| FIG. 1 | $(m + c) l_1$ [since $l_2 = l_1$] | $(m + c) l_1^2$ |
| FIG. 2 | $c l_1 - m l_2$ | $c l_1^2 + m l_2^2$ |
| FIG. 4 | $(c l_1 \cos\theta_1) - (m l_2 \cos\theta_2)$ | $c l_1^2 + m l_2^2$ |

BRIEF DESCRIPTION OF THE DRAWINGS

Further features and advantages of the present invention will be better understood by reference to the following detailed description of the invention, which is given by way of example and in association with the accompanying drawings, in which.

DETAILED DESCRIPTION OF THE INVENTION

Figure 2:
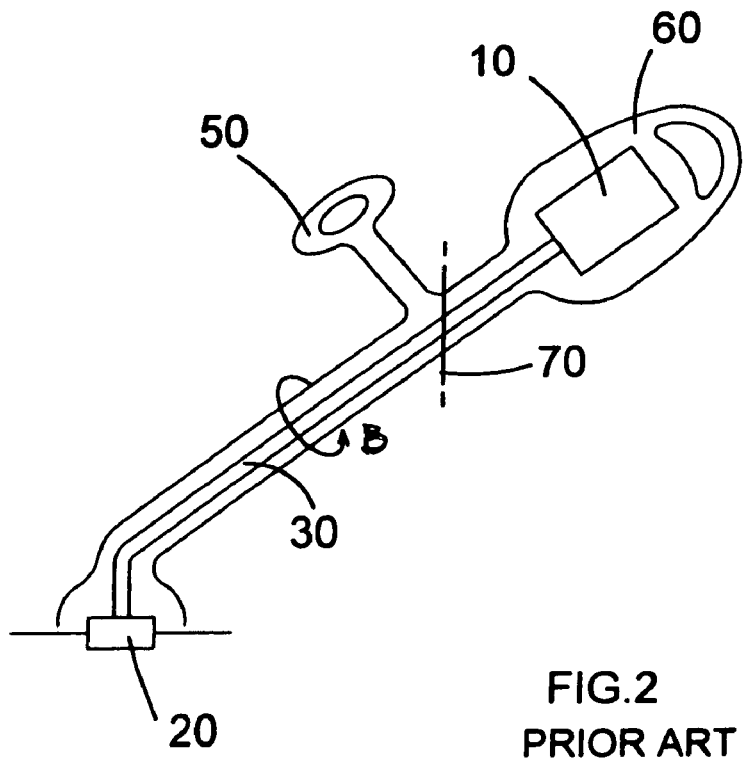
FIG. 2 is a schematic drawing of a second possible layout of a conventional vegetation trimmer.
Figure 4:
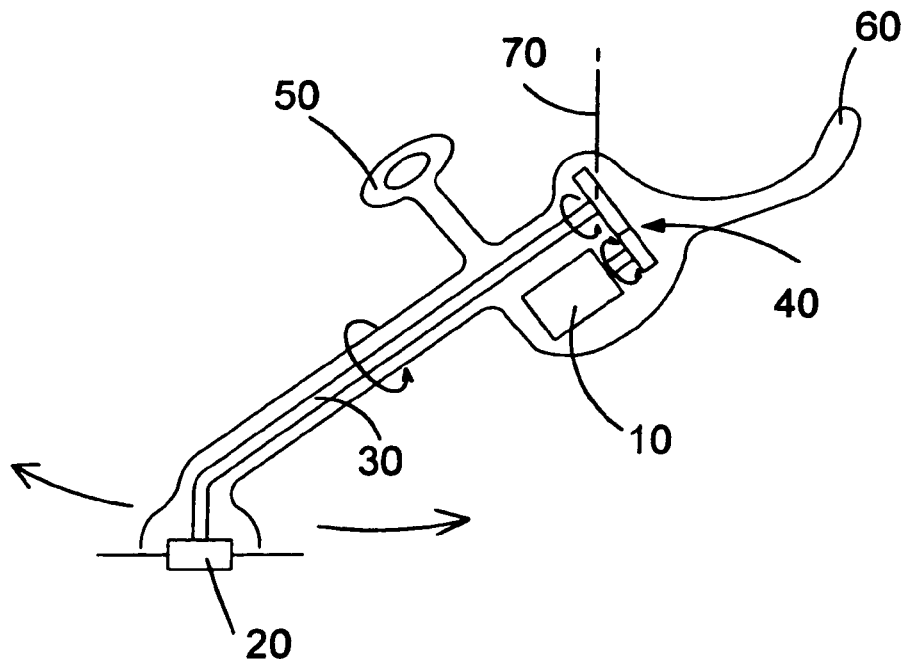
FIG. 4 is a schematic drawing of one possible layout of a vegetation trimmer according to the present invention.
Figure 5:
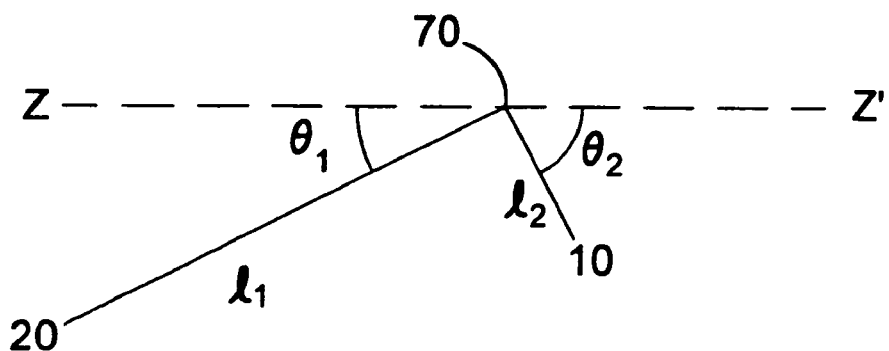
FIG. 5 is a diagram representing the calculation of the static moment of a vegetation trimmer according to the present invention.

Referring firstly to FIG. 4, it may be seen that since the rear handle 60 in the trimmer of the invention does not contain any moving parts, it may be detached from the rest of the trimmer with ease, to leave a trimmer body having a shorter overall length, allowing the disassembled parts thereof to be packed into a smaller carton for ease of shipping and storage. Front handle 50 may further be adjustable and/or detachable to allow the trimmer to be made more compact still for ease of shipping and storage. Although it is known for conventional vegetation trimmers comprising a flexible drive shaft to have a front handle in the location of handle 50 shown in FIG. 4 which is adjustable and/or detachable, the removability of rear handle 60 is not known in such prior art trimmers and is advantageous over known trimmers with the layout of FIG. 2, which cannot be disassembled into a shorter length, since in the layout of FIG. 2, the motor is located at the top end of the trimmer. Moreover, the combination of having two handles 50 and 60, both of which are adjustable in position, gives greater flexibility than known vegetation trimmers in which only a single handle is adjustable in position, thereby improving the overall ergonomics of the trimmer.

In a preferred embodiment of the present invention, the shape of the rear handle 60 is not axially symmetric, i.e. it is curved, in the manner represented in FIG. 4. With such a curved rear handle, the trimmer has a very comfortable shape, allowing a user to hold it and swing it from side to side during operation in the manner of a traditional hand-operated scythe.

Moreover, the curved rear handle may be provided with an adjustment mechanism, which allows it to be mounted to the rest of the trimmer in one of three different possible positions, as follows:

(a) one suitable for use most comfortably by left-handed users, in which the curved rear handle 60 lies to one side of the main axis of the trimmer;

(b) one instead suitable for use most comfortably by right-handed users, in which the curved rear handle 60 lies to the other side of the main axis of the trimmer; and (c) a third, laterally symmetric position usable with comfort by either left- or right-handed users, in which the curved rear handle 60 is positioned vertically above the main axis of the trimmer.

In a simple embodiment, the adjustment mechanism for setting the rear handle in one of these three positions may merely comprise a knob for tightening handle 60 against the rest of the trimmer. The face of handle 60 which contacts the rest of the trimmer may be provided with ridges radiating outwardly from the centre of the knob which engage with corresponding grooves in the face of the rest of the trimmer contacting the rear handle. This groove and ridge arrangement could, of course, be reversed between these two components of the trimmer.

Figure 3:
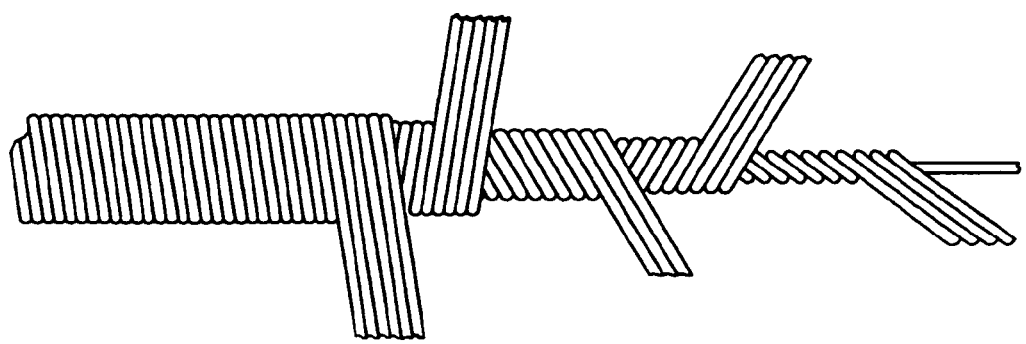
FIG. 3 shows a flexible drive shaft of a type suitable for use in a vegetation trimmer having the layout of FIG. 2.
Figure 6:
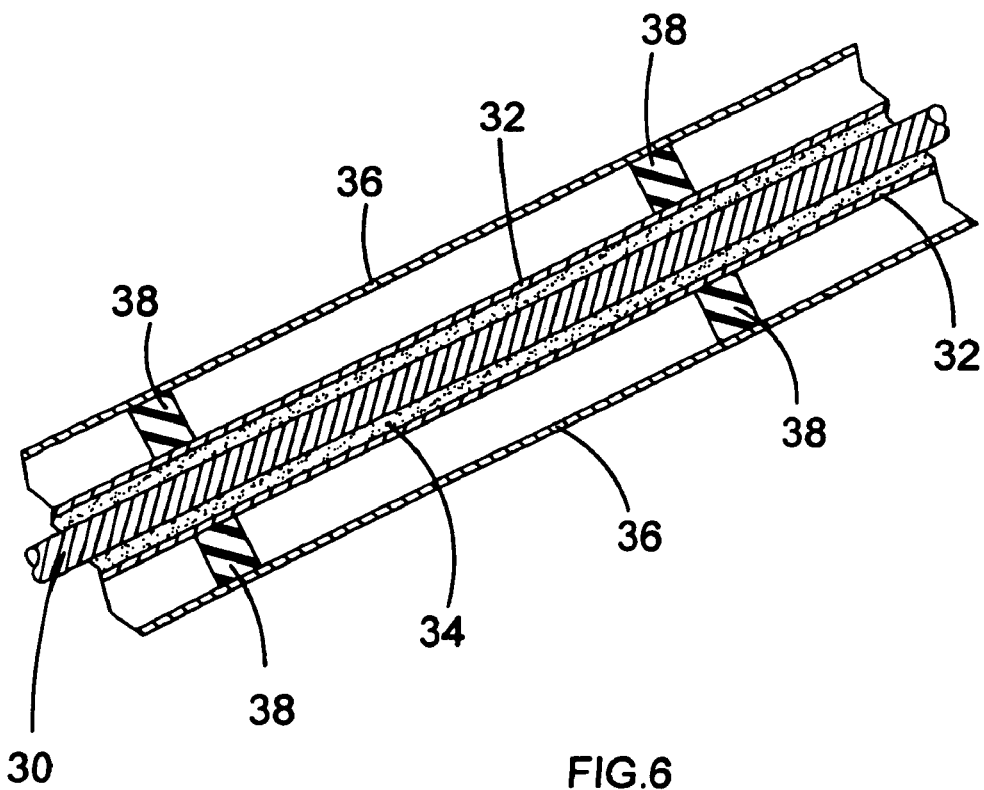
FIG. 6 is a longitudinal section through a pole of a vegetation trimmer, showing the manner of mounting a flexible drive shaft of the type shown in FIG. 3 therein.
Figure 7:
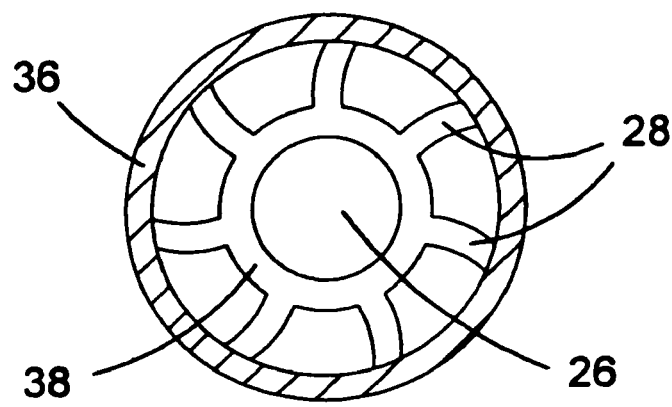
FIG. 7 is a transverse section through a pole of a vegetation trimmer, showing the manner of mounting a flexible drive shaft of the type shown in FIG. 3 therein.

According to another preferred embodiment, the flexible drive shaft of FIG. 3 can be mounted inside the main pole of the trimmer in the manner shown in FIG. 6. The drive shaft 30 rotates within a flexible nylon tube 32 filled with grease 34. The flexible nylon tube 32 is securely held within the pole 36 of the trimmer by rubber rings 38. The pole is typically made of aluminium. A cross-section of one of the rubber rings 38 is shown in FIG. 7. As can be seen in FIG. 7, the rubber rings 38 have a set of radially extending vanes 28 on their circumference, which are bent over in the manner shown in FIG. 7 when the rings are forced into the pole 36, thereby making a secure fit with the pole. A central lumen 26 in the middle of each ring 38 is for receiving the nylon tube 32, containing the drive shaft.

Figure 8:
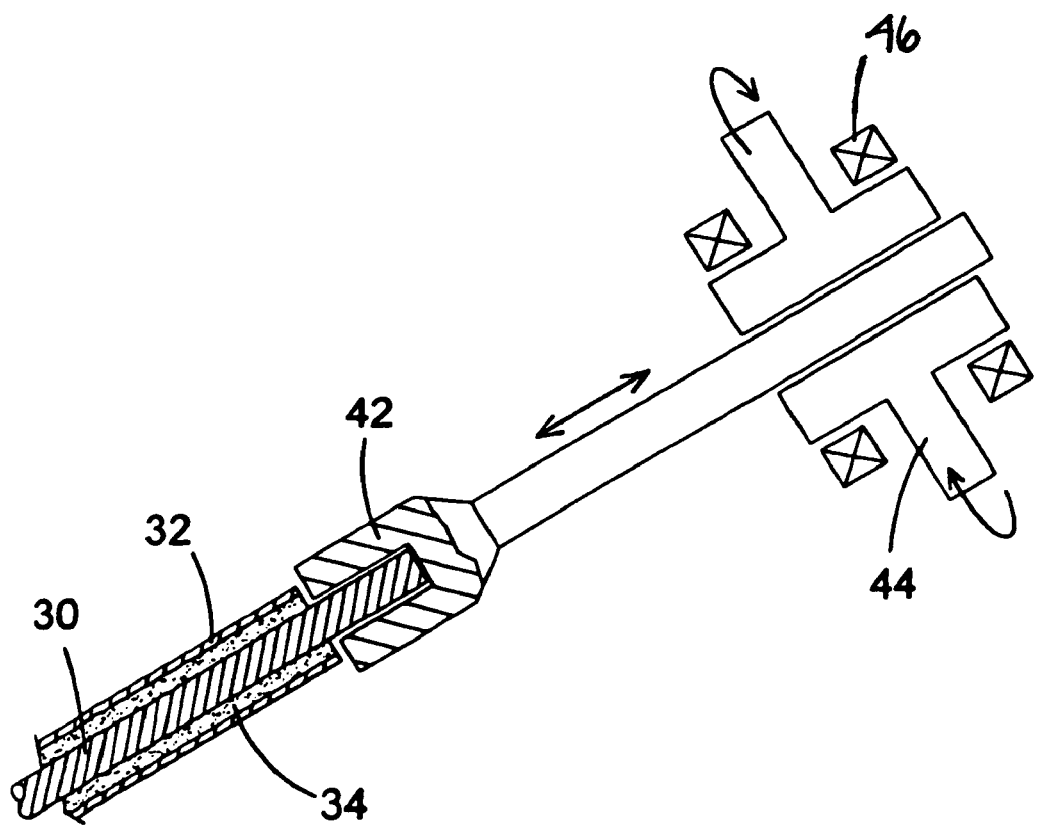
FIG. 8 is a longitudinal section showing an embodiment of a coupling of the flexible drive shaft of FIG. 3 to a cogwheel.

In a preferred embodiment, as shown in FIG. 8, the top end of the flexible drive shaft 30 is firmly attached to a steel spline, 42. The spline is free to slide within a cogwheel 44 of a gear mechanism for transferring the output from the motor to the flexible drive shaft 30. The shaft of the spline has a cross-section which keys into a hole formed in the middle of the cogwheel 44. For example, if the shaft of the spline has a square cross-section, the hole in the middle of the cogwheel 44 has a square profile as well. Thus the spline turns when the cogwheel turns, imparting the motion of the cogwheel to the flexible drive shaft via the spline, even though the spline is free to slide longitudinally in the hole formed in the middle of the cogwheel, in the manner indicated in FIG. 8 by the double-headed arrow. The cogwheel is mounted on bearings 46 held within the body of the vegetation trimmer.

The operating height of the trimmer according to this embodiment can therefore be adjusted as follows. The pole 36 of the trimmer (which surrounds the flexible drive shaft 30 and is firmly coupled thereto by means of the rubber rings shown in FIG. 7) can slide within the body of the trimmer, thereby making the exposed part of the pole 36 shorter or longer. This causes the spline 42 to slide within the cogwheel 44. The pole 36 can be provided with a number of click-stops within the body of the trimmer and end stops limiting its range of travel beyond a certain point in each direction, up and down. The click-stops may be operated by a user by means of a button located on the front of the trimmer for adjusting the height of the pole. Depressing this button releases the pole from one of its click-stops and allows it to be slid up or down. The button may be spring-loaded, so that when it is released, it re-engages with one of the click-stops on the pole. Thus the height of the trimmer may be adjusted by selecting one of these click-stops with the button and the spline 42 will slide accordingly within the cogwheel 44, ensuring that motion continues to be transferred from the motor to the drive shaft at all of the available height settings of the pole.

Figure 1:
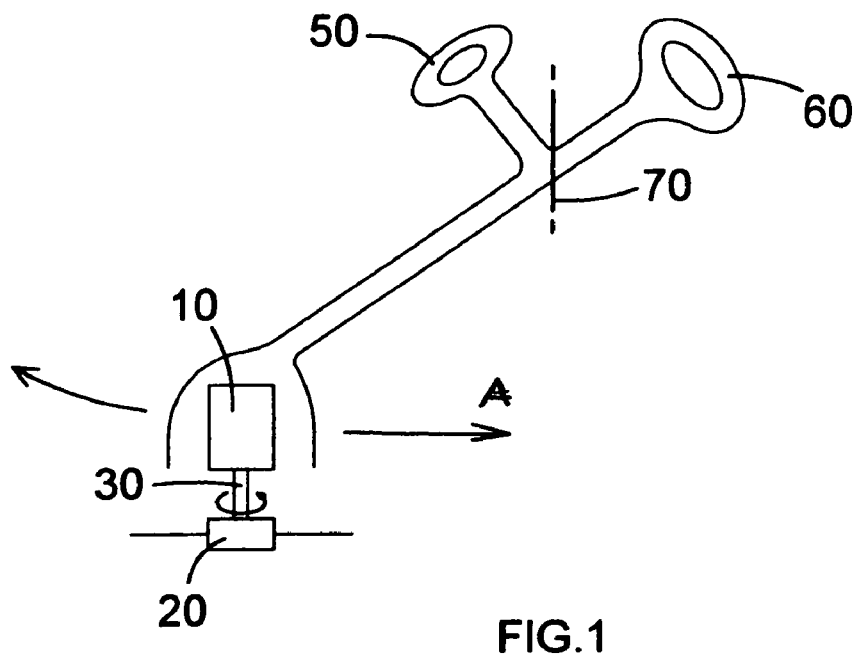
FIG. 1 is a schematic drawing of a first possible layout of a conventional vegetation trimmer.

Moreover, in a preferred embodiment, depressing the height adjustment button may also allow the pole to be rotated around its longitudinal axis relative to the motor housing and the handle or handles. If it is rotated through 90 degrees, this puts the trimmer in a suitable configuration for trimming the borders of an area of grass (an edging operation). The pole may therefore also be provided with two sets of click-stops at 90 degrees to those used for conventional side-to-side trimming, one set being for left-handers and the other for right-handers. Rotating the pole about its long axis in this fashion merely causes the spline 42 to drive the cogwheel 44 in the opposite direction. The pole 36 may therefore be rotated about its long axis by any amount in either direction without any problem. In a conventional vegetation trimmer with the layout of FIG. 1, this cannot be done with ease, because electrical wires passing down the pole of the trimmer from the wire entry point at the top of the trimmer to the motor at the bottom thereof risk becoming twisted when the pole is rotated.

Figure 9:
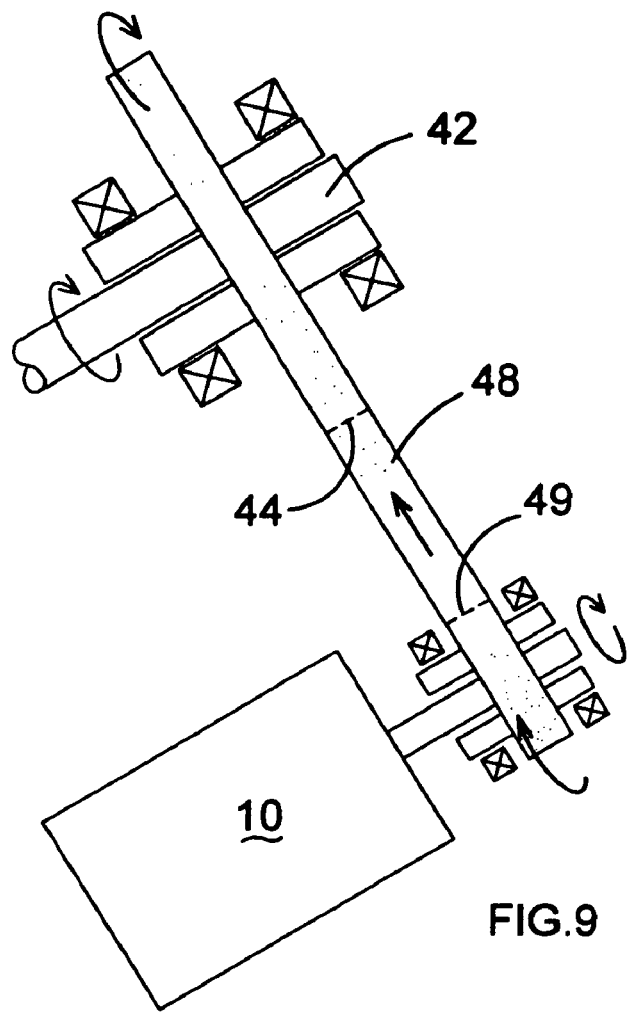
FIG. 9 is a schematic side view of an embodiment of a gear mechanism suitable for use in a vegetation trimmer according to the invention.
Figure 10:
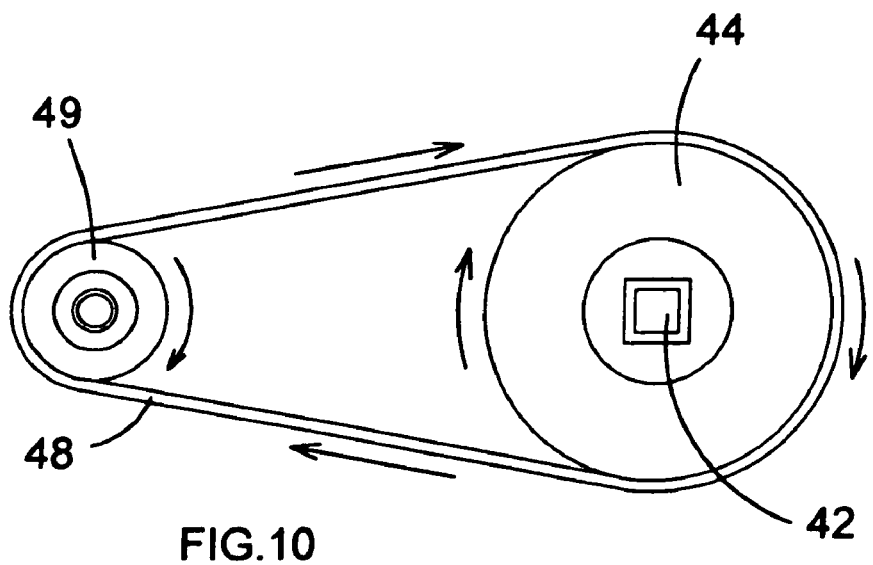
FIG. 10 is a schematic end view of the gear mechanism of FIG. 9.

In another preferred embodiment of the invention, the vegetation trimmer may comprise a gear mechanism which connects the motor to the flexible drive shaft via a rubber belt 48, as shown in FIG. 9 (side view) and FIG. 10 (end-on view). In FIGS. 9 and 10, 44 is the cogwheel connected to the spline 42, and 49 is a cogwheel mounted on the output shaft of the motor 10. 44 is larger than 49 in order to reduce the rotation rate of the drive shaft 30 relative to that of the motor 10. The use of a rubber belt to connect cogwheels 44 and 49 is advantageous in reducing the noise generated during operation of the trimmer in comparison to a trimmer comprising a gear mechanism in which cogwheel 44 contacts cogwheel 49 directly.

Figure 11:
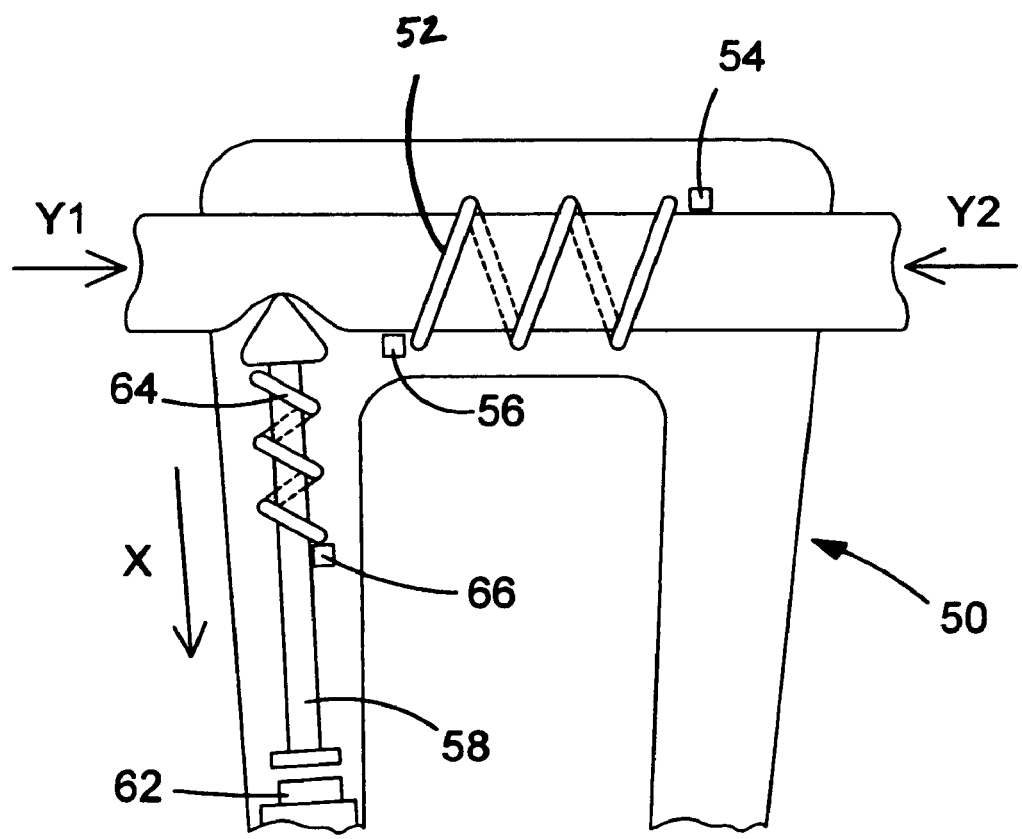
FIG. 11 is a schematic view of a switching mechanism according to one embodiment of the present invention.

In a further preferred embodiment of the invention, the front handle 50 of the vegetation trimmer contains a switching mechanism for actuating the motor. An embodiment of such a switching mechanism is shown in FIG. 11. In this arrangement, a push button protrudes from either side of front handle 50, one of these two push buttons being for operation by left-handed users and the other for right-handed users. If a user presses on the push button in the direction of arrow Y1, compression spring 52 is squeezed against end-stop 54, and if a user instead presses on the push button in the direction of arrow Y2, compression spring 52 is instead squeezed against end-stop 56. Thus in either case, as soon as the user releases pressure from the push button, the bar between the two push buttons returns to its central position with both push buttons partially exposed.

In both cases, a camming surface formed on the underside of the bar between the two push buttons causes a push rod (labelled 58 in FIG. 11) to move in the direction indicated by arrow X whenever one of the push buttons is depressed. The push rod 58 in turn acts on a press switch 62 which is electrically connected to operate the motor. When the push rod 58 moves in the direction of arrow X, a second compression spring 64 is also squeezed against end-stop 66. Thus when the user releases the push button under operation, the push rod 58 returns to its initial position, relieving the pressure on press switch 62 and the motor ceases operation.

Accordingly, the vegetation trimmer of the invention has improved balance and inertia, making it easier for a user to operate, and in certain embodiments thereof can be made more compact than a conventional vegetation trimmer having a flexible drive shaft for greater ease of shipping and storage. Moreover, the trimmer of the invention may be operated with equal comfort by both left- and right-handed users in both trimming and edging modes, may be adjusted for comfortable operation by users of different heights, and also has reduced noise.

Finally, although the present invention has been described by particular reference to vegetation trimmers having a cutting head with rotatable cutting line and/or blades, it may readily be seen by a person of ordinary skill in the art that the present invention is equally applicable to vegetation trimmers having a cutting head comprising a reciprocating blade or blades, such as a hedge trimmer. In such a case, the cutting head will further comprise an interlink mechanism for converting the rotary motion of the flexible drive shaft into the reciprocating motion of the cutting blade or blades. Such an interlink mechanism may for example comprise a scotch yoke.

The invention claimed is:

1. A hand-held vegetation trimmer comprising:
   a body having a cutting head located at one end and a rear handle located at a other end thereof;
   a motor;
   a flexible drive shaft for transferring the output of the motor to the cutting head; and
   wherein the motor is located between the cutting head and the rear handle along a vertical line extending through the fulcrum of the vegetation trimmer;
   wherein the flexible drive shaft is attached to a spline and the spline is free to slide within a cogwheel of a gear mechanism for transferring the output from the motor to the flexible drive shaft.

2. The Vegetation trimmer according to claim 1, wherein the gear mechanism connects the motor to the flexible drive shaft via a rubber belt.

3. The vegetation trimmer according to claim 1, wherein the cutting head comprises a rotatable blade.

4. The vegetation trimmer according to claim 1, wherein the cutting head comprises a reciprocating blade.

5. The vegetation trimmer according to claim 1, wherein the static moment of the trimmer is generally zero.

* * * * *